US010454291B2

(12) United States Patent
 Petersen

(10) Patent No.: US 10,454,291 B2
(45) Date of Patent: Oct. 22, 2019

(54) DC-DC CONVERSION FOR MULTI-CELL BATTERIES

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/485,540

(22) Filed: Apr. 12, 2017

(65) Prior Publication Data

US 2017/0302093 A1 Oct. 19, 2017

(30) Foreign Application Priority Data

Apr. 13, 2016 (GB) .................................. 1606310.9

(51) Int. Cl.
 *H02J 7/00* (2006.01)
 *H02M 3/158* (2006.01)
(52) U.S. Cl.
 CPC .......... *H02J 7/0065* (2013.01); *H02J 7/0029* (2013.01); *H02M 3/158* (2013.01); *H02J 2007/0067* (2013.01)
(58) Field of Classification Search
 CPC .................................................... H02J 7/0065
 USPC ................................................. 320/118, 140
 See application file for complete search history.

(56) References Cited

U.S. PATENT DOCUMENTS 5,710,504 A 1/1998 Pascual et al.
5,994,885 A * 11/1999 Wilcox ................. H02M 3/156
 323/283
6,084,382 A 7/2000 Hite
6,140,799 A 10/2000 Thomasson
6,150,795 A * 11/2000 Kutkut .................. H02J 7/0018
 320/118
6,195,273 B1 * 2/2001 Shteynberg ............. H02M 1/44
 363/26

(Continued)

FOREIGN PATENT DOCUMENTS

CH 680 691 10/1992

OTHER PUBLICATIONS

"Multi-Level Conversion: High Voltage Choppers and Voltage-Source Inverters," by T.A. Meynard et al., 23rd Annual 1992 IEEE Power Electronics Specialists Conference, Jun. 29-Jul. 3, 1992, pp. 397-403.

(Continued)

*Primary Examiner* — M Baye Diao
(74) *Attorney, Agent, or Firm* — Saile Ackerman LLC; Stephen B. Ackerman

(57) ABSTRACT

A power supply has a multi-level DC-DC converter and a battery pack with two or more cells provided in series. The switching DC-DC converter provides a regulated voltage at an output. The converter has an energy storage element. The switching regulator is designed to selectively operate in two or more different modes. It switches between a first mode where one cell is connected (between battery and inductor of the converter), and the converter functions like a single cell buck converter and a second mode where two cells are connected in series and the converter functions like a two series cell buck converter. In general, any number of cells and modes can be provided, with successive cells being connected in series in each mode.

19 Claims, 6 Drawing Sheets

(56) References Cited

U.S. PATENT DOCUMENTS

| | | | |
|---|---|---|---|
| 6,232,749 B1 | 5/2001 | Hewes et al. | |
| 6,268,666 B1 * | 7/2001 | Bhowmik | H02J 7/345 |
| | | | 307/72 |
| 6,426,601 B1 * | 7/2002 | De Filippis | B60H 1/00428 |
| | | | 180/65.22 |
| 6,586,910 B2 * | 7/2003 | Matsui | H02J 7/0016 |
| | | | 320/122 |
| 6,680,600 B2 * | 1/2004 | Emori | B60L 58/20 |
| | | | 320/126 |
| 9,362,745 B2 * | 6/2016 | Wu | H02J 3/32 |
| 9,985,473 B2 * | 5/2018 | Mondal | H02M 3/156 |
| 9,997,931 B2 * | 6/2018 | Mercier | H02J 7/0018 |
| 2004/0008062 A1 * | 1/2004 | Nguyen | H02M 3/1588 |
| | | | 327/143 |
| 2006/0238029 A1 * | 10/2006 | Hoon | H02M 3/158 |
| | | | 307/39 |
| 2010/0213897 A1 | 8/2010 | Tse | |
| 2010/0261043 A1 | 10/2010 | Kim et al. | |
| 2011/0316497 A1 | 12/2011 | Sardat et al. | |
| 2012/0043818 A1 * | 2/2012 | Stratakos | H02J 3/383 |
| | | | 307/77 |
| 2013/0249319 A1 * | 9/2013 | Cummings | H01L 31/02021 |
| | | | 307/131 |
| 2014/0015488 A1 | 1/2014 | Despesse | |
| 2014/0266069 A1 * | 9/2014 | Deboy | H02J 7/0052 |
| | | | 320/149 |
| 2015/0108844 A1 * | 4/2015 | Zhou | H02J 9/062 |
| | | | 307/80 |
| 2016/0190813 A1 * | 6/2016 | Kumar | H02J 7/0016 |
| | | | 307/18 |
| 2017/0163035 A1 * | 6/2017 | Zhyhinas | H02J 1/12 |
| 2017/0207631 A1 * | 7/2017 | Helling | H02M 7/483 |

OTHER PUBLICATIONS

"High-Efficiency, Regulated Charge Pumps for High-Current Applications," by Brigitte Kormann et al., Texas Instruments, slup 172.pdf, 2001, pp. 4-1 to 4-14.

"Switched-Capacitor Converters with Multiphase Interleaving Control," by Sitthisak Kiratipongvoot et al., 2011 IEEE Energy Conversion Congress and Exposition (ECCE), Sep. 17-22, 2011, pp. 1156-1161.

"A Fully-Integrated 3-Level DC-DC Converter for Nanosecond-Scale DVFS," by Wonyoung Kim et al., IEEE Journal of Solid-State Circuits, vol. 47, No. 1, Jan. 2012, pp. 206-219.

* cited by examiner

| Typical Converter Switch Configurations | | Buck (Figure 4) | | | Buck-Boost (Figure 5) | | | | | Boost (Figure 6) | | | |
|---|---|---|---|---|---|---|---|---|---|---|---|---|---|
| | | S1 | S2 | S3 | S1 | S2 | S3 | S8 | S9 | S1 | S3 | S8 | S9 |
| $V_{OUT} < V_{402}$ | Phase 1 | 1 | 0 | 0 | 1 | 0 | 0 | 1 | 0 | NA | NA | NA | NA |
| | Phase 2 | 0 | 1 | 0 | 0 | 1 | 0 | 1 | 0 | NA | NA | NA | NA |
| | Phase 3 (1S)*6) | NA | NA | NA | 1 | 0 | 0 | 0 | 1 | NA | NA | NA | NA |
| | Phase 3 (2S)*5)*6) | NA | NA | NA | 0 | 0 | 1 | 0 | 1 | NA | NA | NA | NA |
| Increasing load step | Phase 1 (1S)*1)*3) | 1 | 0 | 0 | 1 | 0 | 0 | 1 | 0 | NA | NA | NA | NA |
| | Phase 1 (2S)*2)*3)*5) | 0 | 0 | 1 | 0 | 0 | 1 | 1 | 0 | NA | NA | NA | NA |
| | Phase 2 (1S)*1)*4) | 0 | 1 | 0 | 0 | 1 | 0 | 1 | 0 | NA | NA | NA | NA |
| | Phase 2 (2S)*2)*4)*5) | 1 | 0 | 0 | 1 | 0 | 0 | 1 | 0 | NA | NA | NA | NA |
| | Phase 3 (1S)*6) | NA | NA | NA | 1 | 0 | 0 | 0 | 1 | NA | NA | NA | NA |
| | Phase 3 (2S)*5)*6) | NA | NA | NA | 0 | 0 | 1 | 0 | 1 | NA | NA | NA | NA |
| $V_{402} \leq V_{OUT} < V_{402} + V_{400}$ | Phase 1 | 0 | 0*7) | 1 | 0 | 0 | 1 | 1 | 0 | 0 | 1 | 1 | 0 |
| | Phase 2 | 1 | 0*7) | 0 | 1 | 0 | 0 | 1 | 0 | 1 | 0 | 1 | 0 |
| | Phase 3 (1S)*6) | NA | NA | NA | 1 | 0 | 0 | 0 | 1 | 1 | 0 | 0 | 1 |
| | Phase 3 (2S)*5)*6) | NA | NA | NA | 0 | 0 | 1 | 0 | 1 | 0 | 1 | 0 | 1 |
| Increasing load step | Phase 1*3) | 0 | 0*7) | 1 | 0 | 0 | 1 | 1 | 0 | 0 | 1 | 1 | 0 |
| | Phase 2*4) | 1 | 0*7) | 0 | 1 | 0 | 0 | 1 | 0 | 1 | 0 | 1 | 0 |
| | Phase 3 (1S)*6 | NA | NA | NA | 1 | 0 | 0 | 0 | 1 | 1 | 0 | 0 | 1 |
| | Phase 3 (2S)*5)*6) | NA | NA | NA | 0 | 0 | 1 | 0 | 1 | 0 | 1 | 0 | 1 |
| $V_{402} + V_{400} \leq V_{OUT}$ | Phase 1 | NA | NA | NA | 0 | 0 | 1 | 1 | 0 | 0 | 1 | 1 | 0 |
| | Phase 2 | NA | NA | NA | 1 | 0 | 0 | 1 | 0 | 1 | 0 | 1 | 0 |
| | Phase 3 (1S) | NA | NA | NA | 1 | 0 | 0 | 0 | 1 | 1 | 0 | 0 | 1 |
| | Phase 3 (2S)*5) | NA | NA | NA | 0 | 0 | 1 | 0 | 1 | 0 | 1 | 0 | 1 |
| Increasing load step | Phase 1*3) | NA | NA | NA | 0 | 0 | 1 | 1 | 0 | 0 | 1 | 1 | 0 |
| | Phase 2*4) | NA | NA | NA | 1 | 0 | 0 | 1 | 0 | 1 | 0 | 1 | 0 |
| | Phase 3 (1S) | NA | NA | NA | 1 | 0 | 0 | 0 | 1 | 1 | 0 | 0 | 1 |
| | Phase 3 (2S)*5) | NA | NA | NA | 0 | 0 | 1 | 0 | 1 | 0 | 1 | 0 | 1 |

| | |
|---|---|
| *1) | As long as $V_{402} + V_{400} >$ max. voltage rating of S2 |
| *2) | If $V_{402} + V_{400} <$ max. voltage rating of S2 |
| *3) | Without fixed frequency requirement the converter may directly jump into phase 3 |
| *4) | Without fixed frequency requirement the converter may temporally skip phase 2 |
| *5) | Reduced $V_{OUT}$ ripple |
| *6) | Optional phase (when duty cycle of phase 1 gets close to 100%) |
| *7) | S2 may be omitted, but then $V_{OUT}$ range $< V_{402}$ is no longer supported, otherwise S2 max. voltage rating needs to be larger than $V_{402} + V_{400}$ |

FIG. 9

DC-DC CONVERSION FOR MULTI-CELL BATTERIES

TECHNICAL FIELD

The present disclosure relates to DC-DC power conversion for and in multi-cell batteries, and to multi-cell batteries that can provide DC-DC power conversion.

BACKGROUND

Many types of devices make use of batteries which have multiple cells. In the field of consumer electronic devices, items such as tablets or notebook computers will typically have battery packs that comprise multiple cells.

DC-DC conversion is required to either step down or step up the battery voltage as the supply voltage of the battery pack varies during battery discharge.

Where multiple cells are provided in series, the voltage supplied by a fully charged battery will be higher than the voltage required for operation of the device and so a step down DC-DC conversion is required. A buck converter is usually used for this purpose, which uses an inductor as an energy storage element and has switching elements that selectively couple the inductor with an input voltage, in order to step down the voltage.

However, stepping down from a relatively higher voltage with a buck converter requires relatively high inductance or a relatively high switching frequency and so there are either large components or large losses within the buck converter. In general, stepping up or down a large voltage with a DC-DC converter involves large switching losses.

Multi-level DC-DC converters address this problem by inserting one or more switching capacitors to provide one or more intermediate voltage levels between the input and output voltages.

However, the output current is always provided with two or more switches in series which reduces efficiency, especially for high loads.

SUMMARY

According to a first aspect of the disclosure there is provided a power supply comprising: a battery comprising a plurality of cells coupled in series; and a switching DC-DC converter for providing a regulated voltage at an output and comprising an energy storage element; said switching DC-DC converter being arranged to selectively operate in two or more different modes, wherein for each mode the energy storage element is coupled between a different number of cells and the output.

Optionally, the energy storage element comprises an inductor.

Optionally, the power supply is being arranged to switch from a first mode wherein the energy storage element is coupled between a first number of cells and the output and a second mode wherein the energy storage element is coupled between a second number of cells and the output, said second number of cells being greater than said first number of cells, when an input battery voltage provided by the coupled cell or cells falls below or reaches a predetermined threshold value.

Optionally, the power supply further comprises a switched capacitor converter arranged to transfer charge between cells.

Optionally, in each mode, a single switch is in series between the coupled cells and the energy storage element.

Optionally, the battery comprises one or more terminals between cells for the connection of a DC-DC converter input.

Optionally, the power supply comprises a battery protection device at each intermediate positive node of the cell stack.

Optionally, the power supply comprises a battery protection device at a negative node of the battery.

According to a second aspect of the disclosure there is provided a switching DC-DC converter for providing a regulated voltage at an output, comprising an energy storage element and a plurality of selectable inputs; and being arranged to selectively operate in two or more different modes, wherein for each mode the energy storage element is coupled between a different input and the output.

According to a third aspect of the disclosure there is provided a battery comprising a plurality of cells coupled in series and wherein one or more intermediate terminals are provided between cells for the connection of a DC-DC converter input.

Optionally, the battery comprises a battery protection device at one or more of each intermediate positive node of the cell stack.

Optionally, the battery comprises a battery protection device at a negative node of the battery.

According to a fourth aspect of the disclosure, there is provided a method of supplying power comprising the steps of: providing a power supply with a battery comprising a plurality of cells coupled in series; and providing a switching DC-DC converter for providing a regulated voltage at an output and comprising an energy storage element; said switching DC-DC converter being arranged to selectively operate in two or more different modes, wherein for each mode the energy storage element is coupled between a different number of cells and the output.

According to a fifth aspect of the disclosure, there is provided a method of using a switching DC-DC converter to provide a regulated voltage at an output, comprising the steps of:

providing an energy storage element and a plurality of selectable inputs; and arranging said selectable inputs to selectively operate in two or more different modes, wherein for each mode the energy storage element is coupled between a different input and the output.

BRIEF DESCRIPTION OF THE DRAWINGS

The disclosure will be described, by way of example only, with reference to the accompanying drawings, in which:

FIG. 9 is a table which shows typical switch configurations of the dual input converter.

DESCRIPTION

Figure 1:
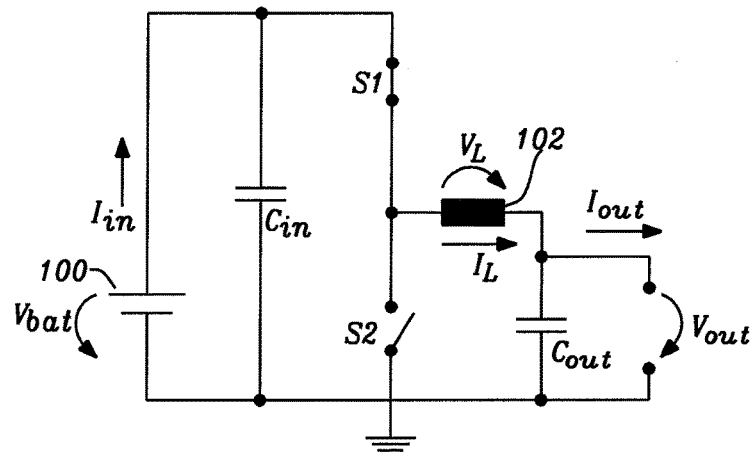
FIG. 1 illustrates a 1S buck converter.

Battery packs in applications such as portable communication device (smartphones) or computing applications (notebooks) comprise either a single cell, multiple cells in series, multiple cells in parallel, or a combination of series and parallel cells. A common notation is to indicate a digit together with a suffix denoting the number and arrangement of cells, for example 2S or 3S denoting two and three cells respectively connected in series; 2P or 3P denoting two and three cells respectively connected in parallel, and combined arrangements such as 3S2P, 2S3P, and so on.

Single cell lithium ion or lithium polymer packs are typically used for smaller applications like media players and phones, while battery packs or more power hungry applications like tablets or notebooks typically comprise multiple cells.

Each multi-cell arrangement has advantages and disadvantages. When charging or discharging a battery pack composed of several cells connected in series, less current is flowing in or out of the battery pack. This reduces power losses (proportional to $I^2R$) inside PCB traces, cables and connectors, allowing smaller traces and components to be provided.

On the other hand, most of the battery power is consumed at levels below the battery pack output voltage. For example, microprocessors and memory manufactured on integrated circuit technologies in the sub 100 nm range typically require voltage levels below 2V, where the standard output voltage of a single lithium ion battery cell is already 3.6V or more. In case of multiple cells in series this increases to 7.2V, 10.8 or even 14.4V. This triggers the need for DC-DC step-down converters, to convert the higher voltage provided by the battery pack to the lower voltages which are required by the system which is powered by the battery pack.

The highest efficiency of DC-DC converters is typically achieved when the conversion ratio Vin/Vout is close to one. A high input voltage requires higher rated transistors (e.g. 12V, 20V), which are typically larger and require more gate charge for turning on. A high input voltage also triggers a low minimum duty cycle, so that the switching frequency has to be selected low enough for the transistor defined minimum on and off time. A low switching frequency increases current ripple of inductive step-down converters, triggering the need for a certain minimum inductance to be provided by an inductor provided as an energy storage element of a DC-DC converter.

In case of a single cell battery pack or cells being only connected in parallel the transistors of the DC-DC converters can be a low voltage type (e.g. 5V). Low voltage transistors of similar Rdson (the drain-source resistance when the transistor is in saturation) require less gate charge for turn on and by that can switch faster. They are also smaller for the same Rdson and so can be manufactured at lower cost. The higher switching frequency means the required inductance is less and therefore the same equivalent series resistance can be provided by smaller inductors. The lower voltage also enables the use of capacitors with reduced ratings, which are smaller for the same amount of effective capacitance. In summary, high current DC-DC converters for microprocessors and memory can be much smaller and efficient when using a low input voltage.

Another factor that affects battery packs is the variable output voltage. This can be as high as 4.2V for a fully charged cell, dropping down to 2.5V at the end of a full discharge.

Figure 2:
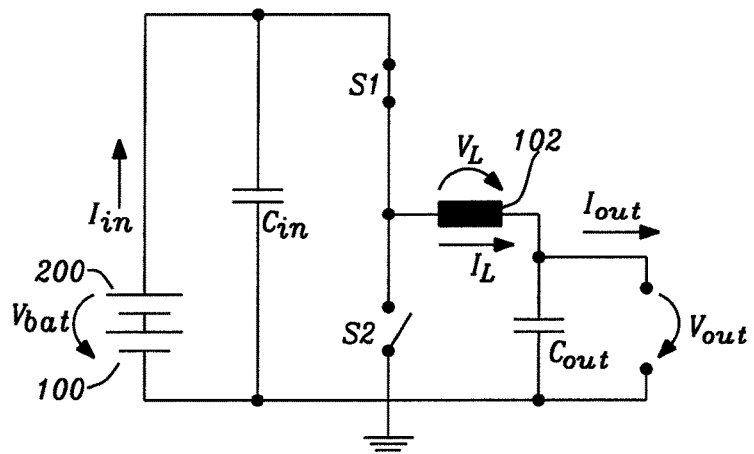
FIG. 2 illustrates a 2S buck converter.

FIGS. 1 and 2 illustrate example structures of typical buck converters used to step down an input voltage to a lower output voltage. FIG. 1 shows a 1S battery pack with a single cell 100, and FIG. 2 shows a 2S battery pack with two cells 100, 200 in series.

For a conventional buck converter of the type shown in FIGS. 1 and 2, the voltage ($V_L$) over the inductor 102 is either Vbat−Vout (in a first phase where switch S1 is closed and switch S2 open) or −Vout (in a second phase where switch S2 is closed and switch S1 is open). Within the first phase the inductor is magnetized, ramping current up according to the inductor formula $dI/dt=V_L/L$. This is important when load current suddenly increases. In combination with the rating of the output capacitor $C_{out}$, the capability to ramp up current in the inductor determines how much the output voltage temporarily collapses from a transient load current.

We take the example of Vout=2V in combination with a 2S battery pack. According to the example values above, this provides a voltage Vbat that varies between 8.4V to 5V over the course of a single battery charge. The minimum inductor voltage $V_L$=5V−2V=3V (assuming each cell 100, 200 shown in FIG. 2 is providing 2.5V). A battery pack with no cells in series (such as the version shown in FIG. 1, or a plurality of cells provided in parallel) provides Vbat=2.5V to 4.2V, so that the minimum $V_L$=2.5V−2V=0.5V. This is six times smaller than the case of a 2S battery pack. To achieve the same transient load response as for the 1S battery pack, the inductor would need to be six times smaller, but for same current ripple the switching frequency would need to be six times higher as well. This typically enables the use of inductors with lower equivalent series resistance, but inductor core loss and the switching loss inside the DC-DC transistors is dramatically increased.

One way of addressing this switching loss issue is to provide a multi-level DC-DC converter. A multi-level DC-DC converter incorporates a switched capacitor (SC) converter together with a buck that has an inductor. The SC converter has a flying capacitor which is selectively switched to step the input voltage to a level that is part way between the input and output voltages. Multiple flying capacitors or equivalent may be provided in order to provide different numbers of levels.

Figure 3:
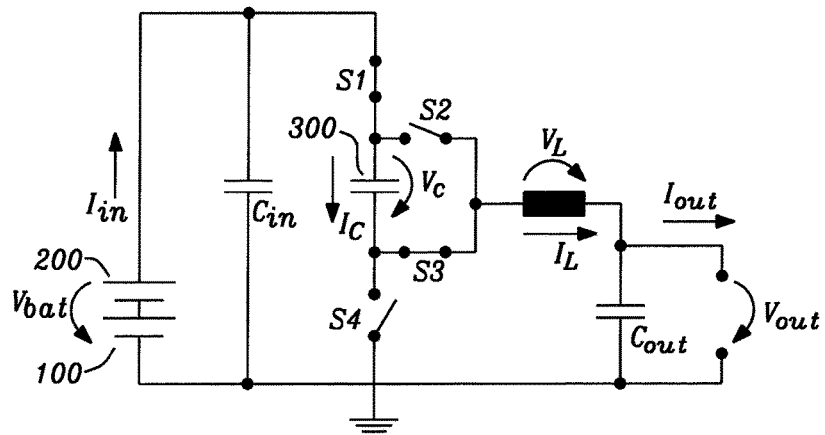
FIG. 3 illustrates a 2S multi-level buck converter.

An example of a multi-level buck converter is shown in FIG. 3. This illustrates a 2S supply similar to that of FIG. 2. Here, an additional flying capacitor 300 is provided together with additional switch elements. When connected, the flying capacitor offsets the inductor voltage $V_L$ by a predetermined delta voltage—in the following illustrative examples we consider this delta to be Vbat/2.

In the buck converter of FIG. 3, $V_L$ is reduced to Vbat−Vbat/2−Vout (in a first phase where switch elements S1 and S3 closed, and switch elements S2 and S4 are open) or Vbat/2−Vout (in a second phase where switch elements S2 and S4 are closed, and switch elements S1 and S3 are open). The reduction of the inductor voltage from (Vbat−Vout) to (Vbat/2−Vout) results in lower current ripple and a lower required switching frequency. During transient load the operation can be changed with switch elements S3 being closed instead of S1, so that $V_L$ is temporarily increased to Vbat−Vout.

This type of DC-DC converter combines the benefits of low input voltage to efficiency and transistor voltage rating with the improved transient load response of converters being supplied from a battery pack with multiple cells in series. However, the output current is always provided with two switches in series, which reduces efficiency especially when it comes to high load.

Closing S1 & S2 exposes the serial connection of S3 & S4 to Vbat. The voltage applied to S3 and S4 then depends on the voltage Vc of the flying capacitor 300. If Vc=Vbat/2 each switch is exposed to Vbat/2. But if Vc=Vbat or Vc=0 one of the switches is exposed to Vbat, which requires an extended transistor voltage rating.

Figure 4:
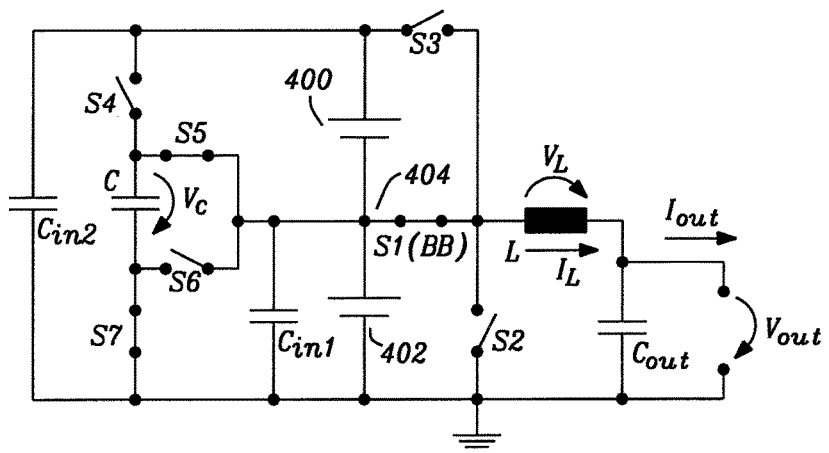
FIG. 4 illustrates a buck converter according to one embodiment of the disclosure.

FIG. 4 illustrates a battery pack and DC-DC converter according to an embodiment of the disclosure, according to which a 2S battery pack and a buck converter are provided.

A first cell 400 and a second cell 402 are connected in series. Each cell has a positive terminal and a negative terminal (cathode and anode). A terminal 404 is provided between the first and second cells 400, 402 for the connection of a DC-DC converter input.

Figure 7A:
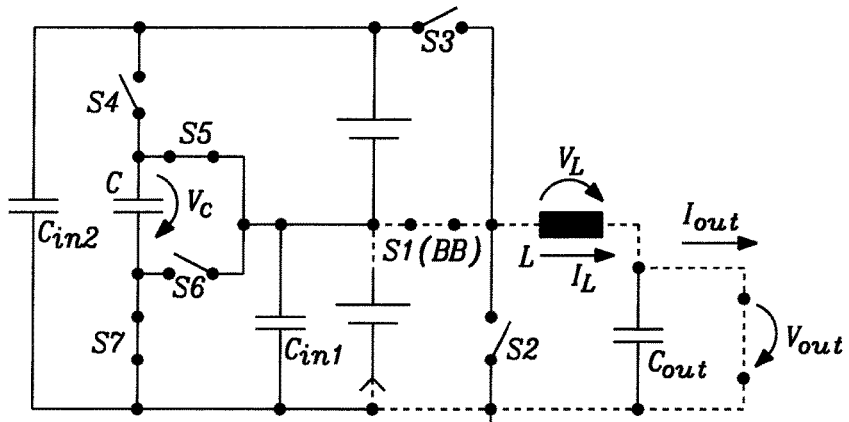
FIGS. 7a-8b illustrate operative configurations of the converter of FIG. 4.
Figure 7B:
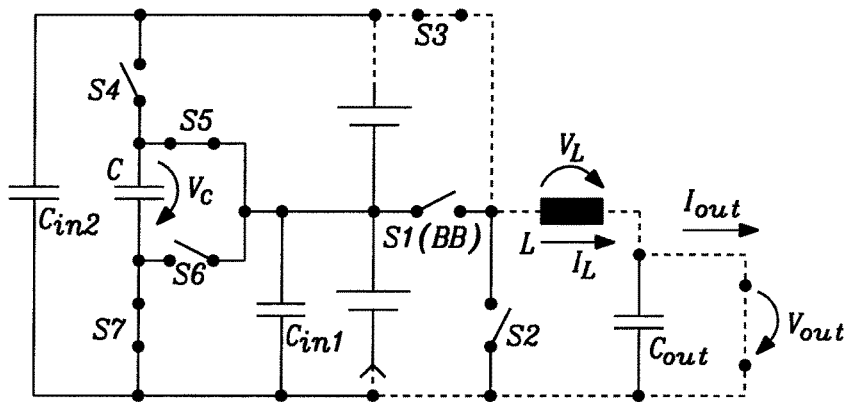
Figure 7C:
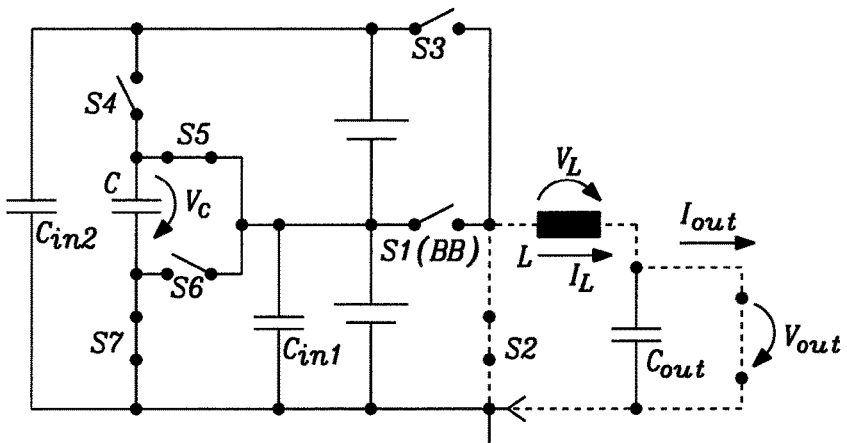

In a first mode, switch element S3 is kept open and switch elements S1 and S2 operate to provide a 1S buck converter via the second cell 402. In a first phase the switch elements S1, S2 and S3 are configured as shown in FIG. 7a for magnetizing the inductor. In a second phase the switching elements S1, S2 and S3 configured as shown in FIG. 7c so that the inductor is de-magnetized. The converter output voltage/current is regulated via the duty cycle of the first and second phases, which is typically proportional to the ratio of Vout/Vbat. This mode provides relatively low inductor current ripple and low switching loss in the DC-DC converter.

In the figure, "BB" signifies a back-to-back configuration of the switching element. For a CMOS implementation with parasitic body diode this typically means two FETs in a mirrored serial arrangement. However, as this increases Rdson or die area significantly the alternative is a dynamic bulk switch, changing the direction of the body diode dependent on the polarity of drain-source voltage. S1 body diode is default from inductor to battery pack (to enable an open S1 switch). But when closing S3 the body diode of S1 needs to change direction to prohibit a short of the top battery cell.

When the converter load current increases suddenly the current in the inductor needs to be ramped up instantaneously. But when the battery voltage across the second cell 402 has dropped close to Vout there is only a low voltage $V_L$ over the inductor, which from $dI/dt=V_L/L$ triggers a slow inductor current ramp. As a result the regulator temporarily doesn't provide the full load current and its output voltage collapses from discharging Cout. But when the battery voltage across the first and second cells 400, 402 has dropped to a predetermined threshold value, in the invented converter S3 may be closed instead of S1 and switch elements S2 and S3 provide a 2S buck converter via the first and second cells 400, 402 with switching phases as shown in FIG. 7b (inductor being magnetised) and 7c (inductor being demagnetised). Assuming that Vout is smaller than the battery voltage across the second cell 402 this mode would only be applied until the inductor current has been ramped above the new load current—This temporary mode provides an improved transient load response as compared with the 1S mode. By that the converter benefits from the advantages of both 1S and 2S modes.

Alternatively, the switching operation may comprise three phases, for example switching between a Phase 1(2S), a Phase 2(1S) and a Phase 2(2S), as shown in FIG. 9. Such a three phase sequence enables a reduced switching frequency when compared with the two phase sequence, Phase 1(2S) followed by Phase 2(1S), as described above. Alternatively, an optional sequence of four phases may be considered, for example a sequence of the Phase 1(1S), the Phase 1(2S), the Phase 2(2S) and the Phase 2(1S). The Phase 2(2S) is equal to the Phase 1(1S), and is selected twice per sequence, thereby reducing the transient voltage step (to ~50%) when progressing inside the sequence from phase to phase.

In the case where Vout is smaller than the output voltage of the series battery stack and higher than the voltage of the bottom cell (402) the converter may switch to an operation whereby the output voltage is regulated via the duty cycle of switch elements S1 and S3 without using S2, implementing an inductor magnetizing phase as shown in FIG. 7b and a de-magnetizing phase as shown in FIG. 7a. This reduces voltage ripple over the inductor, which reduces inductor core loss or enables low switching frequency/lower inductance. Therefore, a converter with an output voltage range that is always smaller than the output voltage of the series battery stack and higher than the voltage of the bottom cell may even omit the implementation of switch S2 and so reduce die area and cost. When Vout is smaller than the voltage of the bottom cell (402) this mode of operation (switch elements S1 and S3 without using S2) implements inductor magnetizing during both switching phases and so maintains a fixed frequency in combination with reduced breakdown of Vout during transient load.

When the switches are implemented as MOSFETs the switch element S1 is not allowed to implement body diode conduction when closing switch S3. This may be achieved via a back-to-back configuration or dynamic bulk switching.

This type of DC-DC converter combines the benefits of low input voltage to efficiency and transistor voltage rating when using the switch elements S1 & S2 with improved transient response in the critical case when the battery pack has been discharged to low voltage (noting that S3 should not be closed before the voltage across the first and second cells 400, 402 has dropped to a range that is inside the voltage rating of S2). The arrangement of FIG. 4 is also superior to a multi-level converter like of FIG. 3 as conversion is implemented using only a single switch to magnetize the inductor or to demagnetize the inductor, where the multi-level converter from FIG. 3 requires two switches in series to implement the same (resulting to more die area and conversion loss).

Figure 8A:
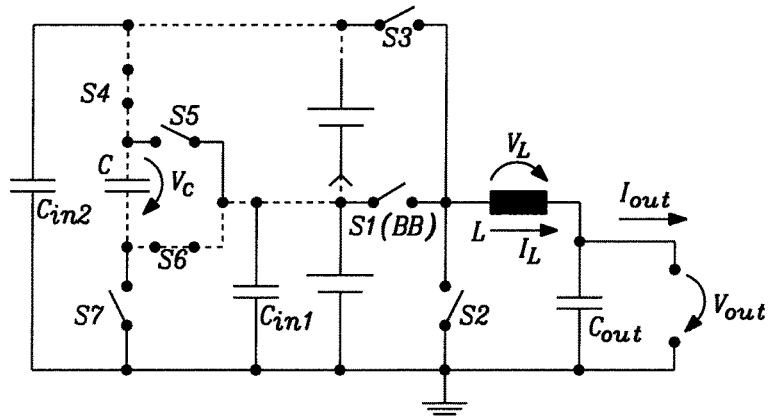
Figure 8B:
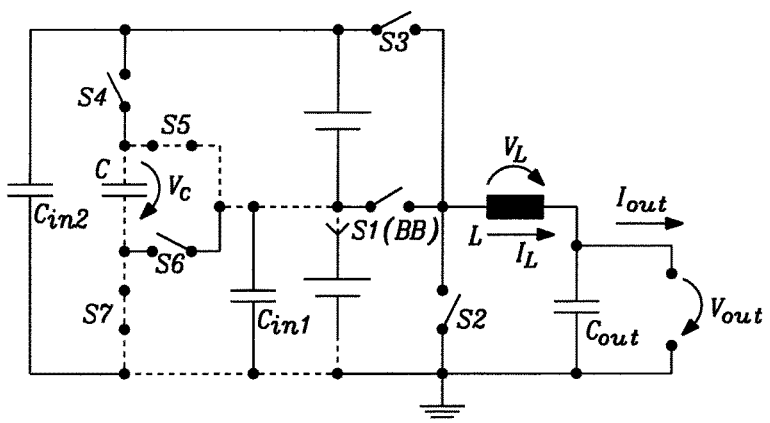

The switches S4-S7 implement a capacitive converter transferring charge from the higher battery cell 400 towards the converter and the lower battery cell 402. FIGS. 8a and 8b show current flow of an example switching sequence at which the bottom cell has been discharged to a voltage below the level of the upper cell. During a first switching phase as shown in FIG. 8a the flying capacitor is charged from the top cell followed by a second switching phase as shown in FIG. 8b, in which the flying capacitor transfers its charge into the bottom cell. As long as the capacitive converter switches the charge balancing continues until the battery cells have an identical voltage. When a load current is applied the current out of the flying capacitor is partially flowing into the inductor instead of into the bottom cell.

The typical current profile of portable computing applications enables an optimized sizing of the switches. As an example, a microprocessor of a modern multi-core system-on-chip (SOC) inside an ultra-portable computing application may pull up to 20-35 A short term peak current (25-60 W), but its long term average consumption is much lower. For fan-less applications its average input power is typically <5 W. And even during the application boot-up sequence the limited time (1-2 min) turbo mode cannot consume more than 15 W without overheating.

This means that the switches S1-S3 needs to be dimensioned for peak output current (e.g. 35 A), but keeping the cells balanced under load requires only a transfer of 50% of the average converter output power (e.g. 5 W) out of the battery cell 400. Dimensioning the cell balancing circuitry larger than minimum becomes an advantage during heavy load as the capacitive converter output impedance reduces effective output impedance of the parallel bottom battery cell 402.

The battery pack provides access to the voltage nodes in between the cells, via terminal 404 and other intermediate terminals for packs with more cells connected in series. One challenge is the battery pack protection, which protects the cells against overload (short circuit) over- and under-voltage. A battery protection device, such as an appropriate FET, is normally provided to protect the battery cells against over-voltage, deep discharge and excessive charge/discharge current. Comparator controlled switches open for any of the faults including external short circuit. The protection device is typically implemented inside the positive node of the battery pack, and so this can be duplicated so that that the converter can access the intermediate nodes. Alternatively, the protection device could be provided at the negative node of the battery pack, protecting the bottom cell and the serial stack at the same time. In this case the converter has to ensure that cell 400 is not shorted (see also back-to-back switch S1). But a risk remains that the positive terminals of cell 400 and 402 are shorted e.g. in the connection towards the converter.

The disclosure also provides cell balancing. In a serial configuration all cells are exposed to exactly the same charge and discharge current. Small production variances in cell self-discharge, temperature behaviour and aging increases the charge misbalance over time. For NiMh technology a serial stack can be re-balanced by over-charging. In this case the already full cell dissipates overcharge current as long as the weaker cell is still in charging mode. But any over-charging of LiIon cells creates safety and life-time issues (in worst case the over-charged cell blows up in flames), so that missing cell balancing in serial LiIon/Li-Polymer stacks becomes an issue over time.

The disclosure is not limited to the topology shown in FIG. 4. Derivatives to a single inductor with multiple inputs (SIMI) converter are topologies with more than a single inductor phase (multi-phase converters) that extend the maximum output current and may reduce voltage ripple via interleaved ripple cancellation.

Figure 5:
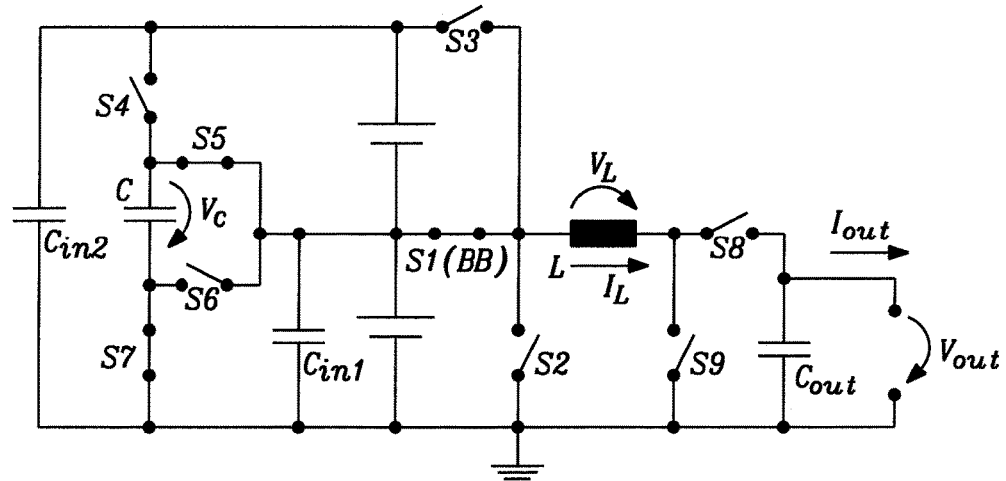
FIG. 5 illustrates a buck-boost converter according to one embodiment of the disclosure.

Another derivate is an inductive converter combining a step-up and step-down capability, as shown in FIG. 5. Within this buck-boost topology the voltage range of Vout may be extended to above the voltage of the serial battery stack. For this, S3 would be typically closed continuously for boost operation providing Vout>voltage across cells 400 and 402, as shown in FIG. 9 as switching between a Phase 1 and a Phase 3(2S). Alternatively, the switching may comprise a sequence of three phases, for example the optional insertion of a Phase 2 (S3 not being closed) into a sequence of the Phase 1 followed by the Phase 3(2S) (Vout>voltage across cells 400 and 402), which enables a lower switching frequency. The same applies when the Phase 3(2S) is replaced by a Phase 3(1S) (S3 not being closed) or in case both the Phase 3(1S) and the Phase 3(2S) are used within a sequence. Only in case of a damaged second cell an output voltage could still be provided by closing S1 instead.

Figure 6:
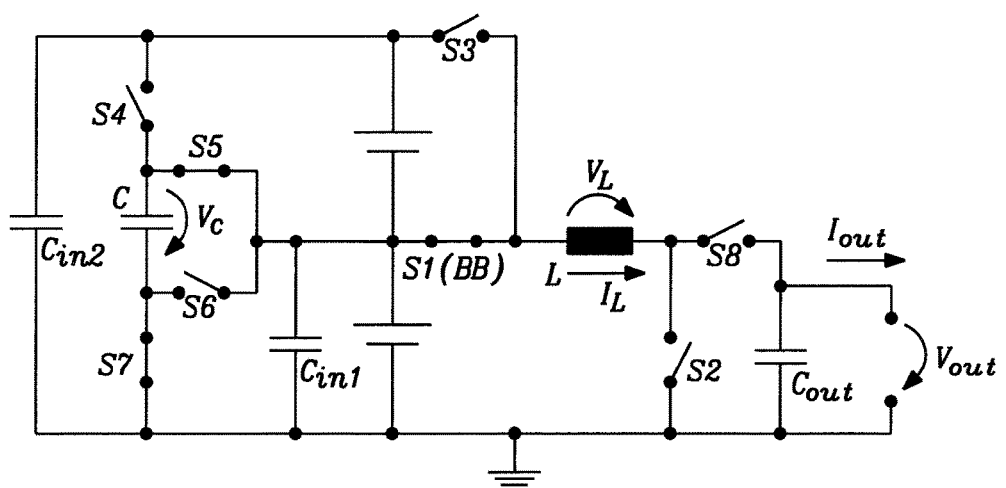
FIG. 6 illustrates a boost converter according to one embodiment of the disclosure.

In case the minimum output voltage is always higher than the voltage of the lower battery cell 402, switch S2 is no longer required and the converter can be reduced as shown in the topology of FIG. 6, which shows a boost converter.

FIG. 9 is a table which shows typical switch configurations of the dual input converter. The contents of the table may be incorporated into this description. In the table, a "1" denotes a closed switch in the diagrams and a "0" denotes an open switch. "NA" stands for "not applicable" and is entered where a given phase (configuration of switches) is not present or the topology cannot implement the combination of battery cell and output voltage.

Battery pack variants are 3S, 4S and more cells in series, and being optionally provided with additional cells in parallel. The principle of balancing charge in between serial battery cells via a switching capacitor converter and using output voltages below the full string output for step-down conversion may be applied to such applications in a similar way.

The capacitive converter may also be implemented with additional switching capacitors, so that e.g. via interleaved switching one of the capacitors is always connected in parallel to the input of S1.

In general, the multiple input inductive converter provided by switching elements S1-S3 and the capacitive converter provided by switching elements S4-S7 do not have to be combined as part of a single unit. Within a more general power tree multiple Power Management ICs and regulators may be connected to different intermediate nodes of a serial battery stack and a separate charge balancing converter may ensure that all serial cells are regulated in average to similar charge (cell voltage). As the capacitive converter may balance the charge of a serial stack independent from which cell has highest voltage, it could also be combined with for example a battery charger charging only a subset of the cells (e.g. only the bottom cell from VBUS=5V) and the input charge is distributed by the capacitive converter to cells connected in series until all cells have similar voltage.

It should be noted that charge balancing increases effective capacity of a serial battery stack that typically becomes unbalanced over life time. It improves safety as unbalanced cells are no longer over-charged at the end of the charging cycle (CV phase) and extends the life time of a serial cell pack significantly. This receives increasing importance from the market trend of more and more portable applications implementing non-removable battery pack.

Various improvements and modifications can be made to the above without departing from the scope of the disclosure.

What is claimed is:

1. A power supply comprising:
   a battery comprising a plurality of cells coupled in series; and
   a switching DC-DC converter for providing a regulated voltage at an output and comprising an energy storage element;
   said switching DC-DC converter being arranged to selectively operate in two or more different modes, wherein for each mode the energy storage element is coupled between a different number of cells and the output; and
   wherein:
   said power supply is arranged to switch from a first mode wherein the energy storage element is coupled between a first number of said plurality of cells and the output and a second mode wherein the energy storage element is coupled between a second number of said plurality of cells and the output, said second number of cells being greater than said first number of cells, when an input battery voltage provided by the coupled cell or cells falls below or reaches a predetermined threshold value.

2. The power supply of claim 1, wherein the energy storage element comprises an inductor.

3. The power supply of claim 1, further comprising a switched capacitor converter arranged to transfer charge between cells.

4. The power supply of claim 1, wherein, in each mode, a single switch is in series between the coupled cells and the energy storage element.

5. The power supply of claim 1, wherein the battery comprises one or more terminals between cells for the connection of a DC-DC converter input.

6. The power supply of claim 1, comprising a battery protection device at each intermediate positive node of the cell stack.

7. The power supply of claim 1, comprising a battery protection device at a negative node of the battery.

8. A switching DC-DC converter for providing a regulated voltage at an output, comprising an energy storage element and a plurality of selectable inputs; and being arranged to selectively operate in two or more different modes, wherein for each mode the energy storage element is coupled between a different input and the output; and wherein:

said switching DC-DC converter is arranged to switch from a first mode wherein the energy storage element is coupled between a first number of cells and the output and a second mode wherein the energy storage element is coupled between a second number of cells and the output, said second number of cells being greater than said first number of cells, when an input battery voltage provided by the coupled cell or cells falls below or reaches a predetermined threshold value.

9. A battery comprising a plurality of cells coupled in series and wherein one or more intermediate terminals are provided between cells for the connection of a DC-DC converter input and wherein:

a DC-DC converter for providing said DC-DC converter input comprises:

an energy storage element and a plurality of selectable inputs; and being arranged to selectively operate in two or more different modes, wherein for each mode the energy storage element is coupled between a different input and the output; and wherein:

said power supply is arranged to switch from a first mode wherein the energy storage element is coupled between a first number of said plurality of cells and the output and a second mode wherein the energy storage element is coupled between a second number of said plurality of cells and the output, said second number of cells being greater than said first number of cells, when an input battery voltage provided by the coupled cell or cells falls below or reaches a predetermined threshold value.

10. The battery of claim 9, comprising a battery protection device at one or more of each intermediate positive node of the cell stack.

11. The battery of claim 9, comprising a battery protection device at a negative node of the battery.

12. A method of supplying power comprising the steps of:
providing a power supply with a battery comprising a plurality of cells coupled in series; and
providing a switching DC-DC converter for providing a regulated voltage at an output and comprising an energy storage element;
said switching DC-DC converter being arranged to selectively operate in two or more different modes, wherein for each mode the energy storage element is coupled between a different number of cells and the output; and wherein:
said power supply is arranged to switch from a first mode wherein the energy storage element is coupled between a first number of said plurality of cells and the output and a second mode wherein the energy storage element is coupled between a second number of said plurality of cells and the output, said second number of cells being greater than said first number of cells, when an input battery voltage provided by the coupled cell or cells falls below or reaches a predetermined threshold value.

13. The method of claim 12, wherein the energy storage element comprises an inductor.

14. The method of claim 12, further comprising the step of arranging a switched capacitor converter to transfer charge between cells.

15. The method of claim 12, wherein, in each mode, a single switch is in series between the coupled cells and the energy storage element.

16. The method of claim 12, wherein the battery comprises one or more terminals between cells for the connection of a DC-DC converter input.

17. The method of claim 12, further comprising the step of providing a battery protection device at each intermediate positive node of the cell stack.

18. The method of claim 12, further comprising the step of providing a battery protection device at a negative node of the battery.

19. A method of using a switching DC-DC converter to provide a regulated voltage at an output, comprising the steps of:
providing an energy storage element and a plurality of selectable inputs; and
arranging said selectable inputs to selectively operate in two or more different modes, wherein for each mode the energy storage element is coupled between a different input and the output; and wherein:
said switching DC-DC converter is arranged to switch from a first mode wherein the energy storage element is coupled between a first number of cells and the output and a second mode wherein the energy storage element is coupled between a second number of cells and the output, said second number of cells being greater than said first number of cells, when an input battery voltage provided by the coupled cell or cells falls below or reaches a predetermined threshold value.

* * * * *